Patented Dec. 28, 1943

2,337,930

UNITED STATES PATENT OFFICE 2,337,930

SPARK PLUG INSULATOR

Frank H. Riddle, Detroit, Mich., assignor, by mesne assignments, to Champion Spark Plug Company, Toledo, Ohio, a corporation of Delaware (1938)

No Drawing. Application March 10, 1938, Serial No. 195,107

8 Claims. (Cl. 106—62)

This invention relates to insulating material and a method of making the same, the material being especially suitable for spark plug insulators and uses requiring similar qualities.

A satisfactory spark plug insulator must retain its insulating quality at high temperatures, must be resistant to heat shock in view of the violent temperature changes to which it is subjected, must have sufficient heat conductivity to prevent the portion within the firing chamber from becoming so hot as to cause pre-firing, must have high mechanical strength and should have high thermal-expansion relative to ordinary ceramic material, since it is customarily employed in conjunction with metal parts having coefficients of thermal-expansion higher than ordinary ceramic materials.

A properly made product consisting substantially of recrystallized alumina combines these various requirements to a very great extent. There are other materials which have some of these desirable characteristics to an even higher degree than alumina, but these other materials accompany their good qualities with others which are not so desirable. It has been difficult to produce a properly formed alumina insulating body at a price making it competitive for spark plug purposes. One of the principal difficulties has been the high temperature required for properly firing an alumina body.

It is, of course, well known that the firing temperature of ceramic materials can be lowered by various fluxes, but the addition of the ordinary fluxes to alumina for the purpose of lowering the firing temperature results deleteriously upon the desirable characteristics of the finished product. Some fluxes are injurious because of deleterious effect upon one desirable quality of the resulting product and others because of deleterious effects upon other qualities of the product.

It has been found that substantially pure alkaline earth fluxes, such as magnesia or whiting, produce a marked reduction in the firing temperature of an alumina body without detracting from the good qualities of the resultant insulating material. In fact, when used in proper small quantities, the addition of these materials renders the proper recrystallization of the alumina much more reliable, so that in fact the resultant product is improved from a practical standpoint. Of course, it is readily understood that, to be satisfactory in use, material must be sufficiently uniform so that the poorer of portions thereof are still up to standard in use, otherwise the product cannot be made commercially satisfactory even though individual examples of very satisfactory insulators could be made.

Whiting is a very readily obtainable calcium compound which can be added to purified alumina grains to reduce the firing temperature. Other sources of calcium oxide or other calcium compounds, free from alkali or other deleterious ingredients, may be employed if more convenient, as will be readily understood, but, for convenience, the addition of whiting will be discussed as generic to such compounds. The addition of 2% of whiting has a material effect upon lowering the firing temperature of alumina and assists in the recrystallization and insures a more uniform product. Further reduction in firing temperatures and improvements in some respects result from increased addition of whiting up to 10%, but these larger amounts of whiting accelerate the crystallization to such an extent that the product may not have the desired fine grained structure. It is preferable, therefore, to employ about 2% of whiting and not over 5% thereof, although under some circumstances, as indicated, up to 10% may be employed.

Magnesia likewise has an effect somewhat similar to that described in connection with whiting. The magnesia may be obtained from various sources, such as the sintered or fused magnesia, or brucite may be employed. The magnesium compounds do not appear to have as marked an effect upon the crystal growth as the calcium compounds and may be employed in larger quantities. Although 2% of magnesia has a noticeable effect, it is preferable to use at least 4% of magnesia and greater amounts up to 10% may be employed.

While magnesia and whiting may be used separately and each have its desirable effect, it is found that they have a more marked effect when employed together and without resulting in difficulties which may arise from using calcium compounds in too large quantities. The preferred mixture, therefore, is purified alumina about 94%, whiting 2%, magnesia 4%. If brucite or other source of magnesia is employed, it may be used in a quantity resulting in an equivalent amount of magnesia.

The exact maturing temperature is dependent, of course, upon the exact method of preparation of the materials as well as upon the degree of grinding. It has been found that fine-ground electrically fused corundum with 2% of whiting and 4% of magnesia can be matured at a temperature of around cone 31 and from a reliable and satisfactorily uniform insulating body.

While the exact proportions specified may be varied, those given have been found preferable for all round purposes under the conditions of grinding and firing which have been employed, and therefore are specified as the preferred proportions. It has been found also that substantially the cited amounts and proportions of magnesia and whiting are useful where other mineralizers are added to still further lower the firing temperature, and it is desired, therefore, to claim approximately the addition of whiting and magnesia, as above described, whether or not other materials are added to a body which consists of upwards of 80% alumina, although specific details of the addition of other mineralizers forms no part of the present invention.

Other alkaline earth compounds may be employed with or in place of compounds of magnesium and calcium, since these compounds have the common property of reducing the firing temperature without injuriously affecting the high hot dielectric, as is done by sodium compounds, for example. However, the other compound of this group which has been found most advantageous is a compound of beryllium. This may be added as beryl, if desired. Where beryl is used in conjunction with compounds of magnesia and calcium, such as described above, it is preferred to employ about one per cent of beryl. That is, a mixture of these materials approximately in the proportion of four of magnesia to two of whiting to one of beryl is found highly desirable.

For best results the grinding, mixing and firing should be conducted so that the resultant insulator will be substantially non-porous. This is advantageous because any pores in the insulator are detrimental, since they reduce the insulating quality and reduce heat conductivity, amongst their detrimental effects. One desirable way of preparing bodies from a mixture, such as described, is to mix the materials with sufficient liquid to form a slip and then spray the slip into fine drops and then dry the spray into pellets. These pellets of the mixed materials can then be poured into a suitable mold and pressed therein, preferably under hydrostatic pressure. This produces a body of uniform composition and density, so that when fired the different portions of the body all reach maturity at substantially the same point. In this way, the body can be readily fired so that the material is recrystallized and forms a solid, nonporous product without reaching the molten stage or such a softened stage that there is danger of deformation.

The foregoing description has been based upon the supposition that the alumina employed would be substantially pure. For purposes of fabrication a dense grade of alumina is preferable. Silica is sometimes present as an impurity in alumina, and in limited amounts is not harmful, and for some purposes is somewhat beneficial. It may be tolerated, therefore, as an impurity with the alumina in limited quantities, and also may be introduced, if desired, in combination with the alkaline earth compounds. For example, some of the magnesia, at least, may be introduced as talc. However, silica should not be introduced as an impurity or otherwise in such quantities or in such a way that it will remain uncombined in the finished product.

What I claim is:

1. A substantially non-porous electric insulator consisting of at least eighty per cent alumina and the remainder consisting principally of beryllium compounds, magnesium compounds and calcium compounds.

2. Insulating material in accordance with claim 1, and the alkaline earth compounds consisting of compounds of magnesium, calcium and beryllium in approximately the proportions of four, two and one, respectively.

3. A substantially non-porous electric insulator consisting of at least eighty per cent alumina and the remainder consisting principally of compounds of magnesium and compounds of calcium in approximately the proportions of two to one, respectively.

4. A dense, substantially nonporous electric insulator consisting of a recrystallized product made by firing together an intimate mixture of approximately four per cent of magnesia, two per cent of whiting, one per cent of beryl and the remainder nearly all alumina.

5. The method of making an electric insulator which comprises forming an intimate mixture of powdered alumina and compounds of beryllium, of magnesium and of calcium, the alumina comprising at least eighty per cent of the mixture, forming the mixture into shaped bodies, and firing to form a recrystallized, dense, substantially non-porous product.

6. A method in accordance with claim 5 and wherein the alkaline earth compounds consist of magnesia, whiting and beryl substantially in the proportions of four, two and one, respectively.

7. A method in accordance with claim 5 and wherein the alkaline earth compounds comprise approximately four per cent of magnesia, two per cent of whiting and one per cent of beryl, and wherein the alumina comprises at least ninety per cent of the total mixture.

8. The method of making an electric insulator which comprises forming an intimate mixture of powdered alumina, magnesia and whiting, the alumina constituting at least eighty per cent of the mixture and the magnesia and whiting being in approximately the proportion of two to one, forming the mixture into shaped bodies, and firing to form a recrystallized, dense, substantially non-porous product.

FRANK H. RIDDLE.

CERTIFICATE OF CORRECTION.

Patent No. 2,337,930.  December 28, 1943.

FRANK H. RIDDLE.

It is hereby certified that error appears in the printed specification of the above numbered patent requiring correction as follows: Page 1, second column, line 54, for "and from" read --and form--; and that the said Letters Patent should be read with this correction therein that the same may conform to the record of the case in the Patent Office.

Signed and sealed this 8th day of February, A. D. 1944.

(Seal)

Henry Van Arsdale,
Acting Commissioner of Patents.